US006629136B1

(12) United States Patent
Naidoo

(10) Patent No.: US 6,629,136 B1
(45) Date of Patent: Sep. 30, 2003

(54) SYSTEM AND METHOD FOR PROVIDING GEOGRAPHICALLY-RELATED CONTENT OVER A NETWORK

(75) Inventor: Surendra N. Naidoo, Austin, TX (US)

(73) Assignee: @ Security Broadband Corp., Austin, TX (US)

( * ) Notice: Subject to any disclaimer, the term of this patent is extended or adjusted under 35 U.S.C. 154(b) by 0 days.

(21) Appl. No.: 09/439,375

(22) Filed: Nov. 15, 1999

(51) Int. Cl.[7] ............................................. G06F 13/00
(52) U.S. Cl. ...................... 709/219; 709/223; 709/329; 707/104
(58) Field of Search ................... 709/203, 217, 709/219, 223, 224, 225, 226, 227, 328, 329; 707/10, 104

(56) References Cited

U.S. PATENT DOCUMENTS

| 5,710,887 | A | | 1/1998 | Chelliah et al. ............. 395/226 |
|---|---|---|---|---|
| 5,774,869 | A | | 6/1998 | Toader ......................... 705/10 |
| 5,822,735 | A | | 10/1998 | De Lapa et al. .............. 705/14 |
| 5,826,242 | A | | 10/1998 | Montulli ....................... 705/27 |
| 5,855,007 | A | | 12/1998 | Jovicic et al. ................ 705/14 |
| 5,930,474 | A | * | 7/1999 | Dunworth et al. ........... 709/217 |
| 5,930,699 | A | | 7/1999 | Bhatia ......................... 455/414 |
| 5,938,721 | A | | 8/1999 | Dussell et al. .............. 701/211 |
| 5,948,061 | A | | 9/1999 | Merriman et al. ........... 709/219 |
| 5,953,722 | A | | 9/1999 | Lampert et al. ............. 707/100 |
| 6,029,045 | A | * | 10/2000 | Linsk ........................... 709/203 |
| 6,154,172 | A | * | 11/2000 | Piccionelli et al. .......... 342/357.1 |
| 6,256,498 | B1 | * | 7/2001 | Ludwig ........................ 455/433 |
| 6,332,127 | B1 | * | 12/2001 | Bandera et al. ............. 705/14 |

OTHER PUBLICATIONS

APB Data Center, Printed Mar. 8, 2000.
Neighborhood Link, Printed Mar. 8, 2000.
CommunityPath.com, Printed Mar. 8, 2000.
AtHomeNet, Printed Mar. 8, 2000.
ENeighbors, Printed Mar. 8, 2000.
AirFlash, Printed Mar. 8, 2000.

* cited by examiner

Primary Examiner—Viet D. Vu
(74) Attorney, Agent, or Firm—Kristin Jordan Harkins Conley Rose, P.C.

(57) ABSTRACT

The present invention is designed to seamlessly deliver localized content to users on a network corresponding to each users' geographic area. In particular, the present invention considers a user's geographic location information (such as an address) in the determination of which geographic areas, if any, correspond to the user, and automatically delivers content associated with those geographic areas. By associating a unique spatial identity with a user, the present invention may use various known digital mapping spatial techniques to provide the user with information relevant to the user's location.

38 Claims, 6 Drawing Sheets

SYSTEM AND METHOD FOR PROVIDING GEOGRAPHICALLY-RELATED CONTENT OVER A NETWORK

BACKGROUND OF THE INVENTION

1. Field of the Invention

The present invention relates generally to the provision of content to users on a network. In particular, the present invention relates to a method and system for providing content to the users that seamlessly corresponds to each users' specific geographic location.

2. Description of Related Art

The Internet is massive world-wide network of computers. Specifically, the Internet is comprised of thousands of smaller regional networks scattered throughout the globe. The World-Wide Web (the Web) is a global collection of inter-connected web pages mostly used on the Internet that allows users to navigate information and sites on the Internet intuitively, without technical knowledge of the underlying data network. Web pages are connected through the use of "hypertext links." A hypertext link is a reference to another web page which directs users to that web page when they click on it. Though the terms "Internet" and "World-Wide Web" technically have different meanings, they are often used interchangeably.

Web pages are maintained or "hosted" by "web servers." The software necessary to run these web servers is relatively simple and available on a wide range of computer platforms including PC's. Generally, a server is one or more nodes on a network that is operable to provide services to other nodes on the network. The specific services that a server provides are determined by the server's software and configuration. For example, a web server is a system running software and configured such that it may distribute information to other network nodes that request information. The node making such a request (known as the "client") is typically a PC connected to the network. A form of client software, known as a web "browser," which is used to display web pages on the client system is also widely available.

As more of the general public gains access to the Internet, the increasing number of web pages becomes difficult to manage. A typical way for a user to locate a web page or web site is to use a "search engine." Search engines usually take a user query as input and attempt to find web pages related to that query. Queries are usually in the form of one or several words which describe the subject matter of interest to the user. Most search engines operate by comparing the query to an index of documents to determine if the content of one or more of those documents matches the query.

However, given the millions of web pages on the Web (only a fraction of which have been indexed by search engines), finding a desired web page is often difficult. When a user accesses one of the leading search engines, the search can produce hundreds, even thousands, of "hits" (i.e., documents related to the search query). Finding information corresponding to specific geographic areas is often particularly difficult. Many search engines are not suited to this task because they use key-word searching. For example, a user seeking information about the Miami area would perform a search with "Miami" as the key word. This query would generate a list of web pages with the word "Miami" in it, regardless of whether the page has any content actually relating to the Miami area.

Information providers such as Yahoo! and Citysearch provide web sites for specific cities that contain information relating to those cities. However, particularly with large cities, city-level information is too broad. In addition, these sites often require the user to manually select the particular geographic site which corresponds to the desired city. For example, a user desiring information about Austin, Tex. would have to visit the "austin.yahoo.com" or the "austin.citysearch.com" web site. In other instances a zip code is requested which is then associated with a metro-area or state to provide local content on respective metro-area and state levels. Other web sites provide visitors with content specific to particular neighborhoods or neighborhood associations. Typically, a user desiring to access such a web site to retrieve content about a particular neighborhood first must manually select the desired neighborhood. In particularly, new residents in an area or residents looking for information on an address or an area they are unfamiliar with may not know which specific geographic area they or the desired address would fall within.

SUMMARY OF THE INVENTION

The present invention solves the above-noted shortcomings in the prior art by providing an improved system and method for seamlessly delivering content corresponding to users' local geographic areas. Specifically, the present invention considers a user's location information (such as an address) in the determination of which geographic areas, if any, correspond to the user, and automatically delivers content associated with those geographic areas.

Before summarizing the present invention, a subtle distinction must be made. Many prior art web sites offer localized content on city and even neighborhood levels. However, the content of these sites are not associated with a user's actual location. Rather, these prior art sites typically require a user to manually select the geographic area(s) to which the user is a part. Other prior art sites use imprecise, non-unique information such as zip codes which are associated with particular cities or counties. In contrast, the present invention is directed to the delivery of localized content that automatically corresponds to the user's geographic location.

The present invention provides content (both information and services) to users over a network or networks such as the Internet. Advantageously, unlike prior art web sites that provide information based upon a user's city or zip code, the present invention automatically provides information corresponding to local geographic areas that are specific to a user by considering the user's geographic location or address. To determine what information is specific to the user's local geographic area, a set of coordinates (e.g., a latitude and longitude, or any other coordinate system) corresponding to the user's address may be established using any available positioning system, such as a geocoder. A geocoder is a program which converts a street address into longitude and latitude. Numerous publicly-accessible geocoders are publicly and commercially available. By associating a unique spatial identity with a user, the present invention may use various known digital mapping spatial techniques to provide the user with information relevant to the user's location.

Advantageously in the present invention, content may be provided in a seamless manner, i.e., without the user having to manually enter his or her geographic location (e.g., address) or to specify a particular geographic area with each request for information. For example, in the present invention, a user would request a list of schools in his or her neighborhood by selecting the "list of schools in my neighborhood" option rather than requesting a list of schools for the user's particular neighborhood without any further prompting of the user. In this example, the present invention would be operable to automatically determine (1) which neighborhood the user was in, and (2) which schools correspond to that particular neighborhood.

The information content may be displayed in text form, graphically on a map, a combination of the two, or in any other fashion that is known in the art. In one embodiment, the content may be visually presented as an area with a boundary (polygon) and/or as a point on the map. In this embodiment, a user could interact with the digital map by clicking on the polygons and points drawn on the map to obtain the information represented by that specific map object in that layer of information (as determined by the subject chosen).

In one respect, the present invention may comprise a method of providing content to a user on a network, comprising the steps by a network server of storing registration information of the user, wherein the registration information comprises specific geographic location information; determining geographic coordinates from the specific geographic location information; and seamlessly providing content to the user corresponding to a geographic area containing the user's geographic coordinates in response to a request for content by the user. The network may be the Internet. A geocoder may be used in determine geographic coordinates from the specific geographic location information. The specific geographic location information may include an address of the user, or Global Positioning System information of the user. The specific geographic location information may relate to the user's home address. In some embodiments, the geographic area may be dynamically determined based upon a desired geographic level in response to the request for content by the user. The desired geographic level may be, but is not limited to, a census tract, a neighborhood, a subdivision, a school district, or a trade area. In one of these embodiments, the desired geographic level may be specified in the request for content by the user. Alternatively, the desired geographic level may be determined automatically based upon the subject matter of the content requested by the user.

Content refers to any information or services that may be provided over a network. Content may include a chat room service comprising the step of allowing the user to access one or more electronic chat rooms corresponding to the geographic area. The chat room service may further comprise instant messaging functionality. Content may also include a bulletin board service comprising the step of allowing the user to access one or more electronic bulletin boards corresponding to the geographic area. Content may also include an email distribution service comprising the step of providing the user with access to one or more email distribution lists corresponding to the geographic area. Content may also include one or more promotional notices corresponding to the geographic area, one or more links to web sites corresponding to the geographic area, and/or a directory service comprising telephone directory information corresponding to the geographic area.

In another respect, the present invention is directed to a communications system comprising a content provider node, and a web site hosted by the content provider node, wherein the web site is configured to be accessible by one or more remote users, wherein each of the one or more remote users has an associated geographic location, and wherein the content provider node is configured to store the associated geographic location; and wherein the content provider node is configured to be responsive to requests for content from the one or more remote users by providing content on the web site for the remote users, the requests for content including a desired content topic, and the content seamlessly correspond to the desired content topic and to a geographic area encompassing the associated geographic location. The associated geographic location may include geocoded coordinates. The request for information may further include a desired geographic level. Alternatively, the desired content topic may have an associated geographic level, wherein the breadth of the geographic area corresponds to the associated geographic level. In these embodiments, the geographic area may be dynamically determined based upon a desired geographic level in response to the request for content by the user. The desired geographic levels may be, but are not limited to, census tracts, neighborhoods, subdivisions, school districts, and trade areas.

Content may include the following services and information which may all be configured to be accessible by the user node: a chat room service comprising one or more electronic chat rooms corresponding to the geographic area; a bulletin board service comprising one or more electronic bulletin boards corresponding to the geographic area; an email distribution service comprising one or more email distribution lists corresponding to the geographic area; one or more promotional notices corresponding to the geographic area; one or more links to web sites corresponding to the geographic area; and/or a directory service comprising telephone directory information corresponding to the geographic area. In a specific embodiment, the chat room service may further include instant messaging functionality.

In another respect, the present invention is directed to a communications system comprising a content provider node; a communications device coupled to the content provider node, having an associated geographic location; wherein the communications device is configured to provide a request for content to the content provider node, the request for content comprising a desired content topic and information relating to the associated geographic location of the communication device; wherein the content provider node is configured to be responsive to requests for content from the communications device by providing content to the communication device, wherein the content seamlessly corresponds to a geographic area encompassing the associated geographic location of the communication device. The user node may be coupled to the network through a wireless medium. The information relating to the associated geographic location may comprise GPS coordinate data of the user node. In one embodiment, the request for information may further comprise a desired geographic level, wherein the geographic area corresponds to the geographic level. Alternatively, the content may have an associated geographic level, wherein the geographic area corresponds to the geographic level.

In another respect, the present invention is directed to a communications system comprising a user node configured to operatively couple to a network, the user node configured to provide requests for information on the network, and having an associated address; and a content provider configured to operatively couple to the network, and having a respective web site on the Internet, wherein the web site is configured to be accessible by the user node, and is configured to store the associated address of the user node; wherein the content provider is configured to be responsive to requests for information from the user node by providing content on the web site for the user node, the requests for information comprising a desired content topic; and wherein the content seamlessly corresponds to the desired content topic and to a geographic area corresponding to the associated geographic location of the user node. The network may be the Internet. In one embodiment, the request for information may further comprise a desired geographic level, wherein the breadth of the geographic area corresponds to the geographic level. Alternatively, the content topic has an associated geographic level, wherein the breadth of the geographic area corresponds to the geographic level.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Content

Figure 1:
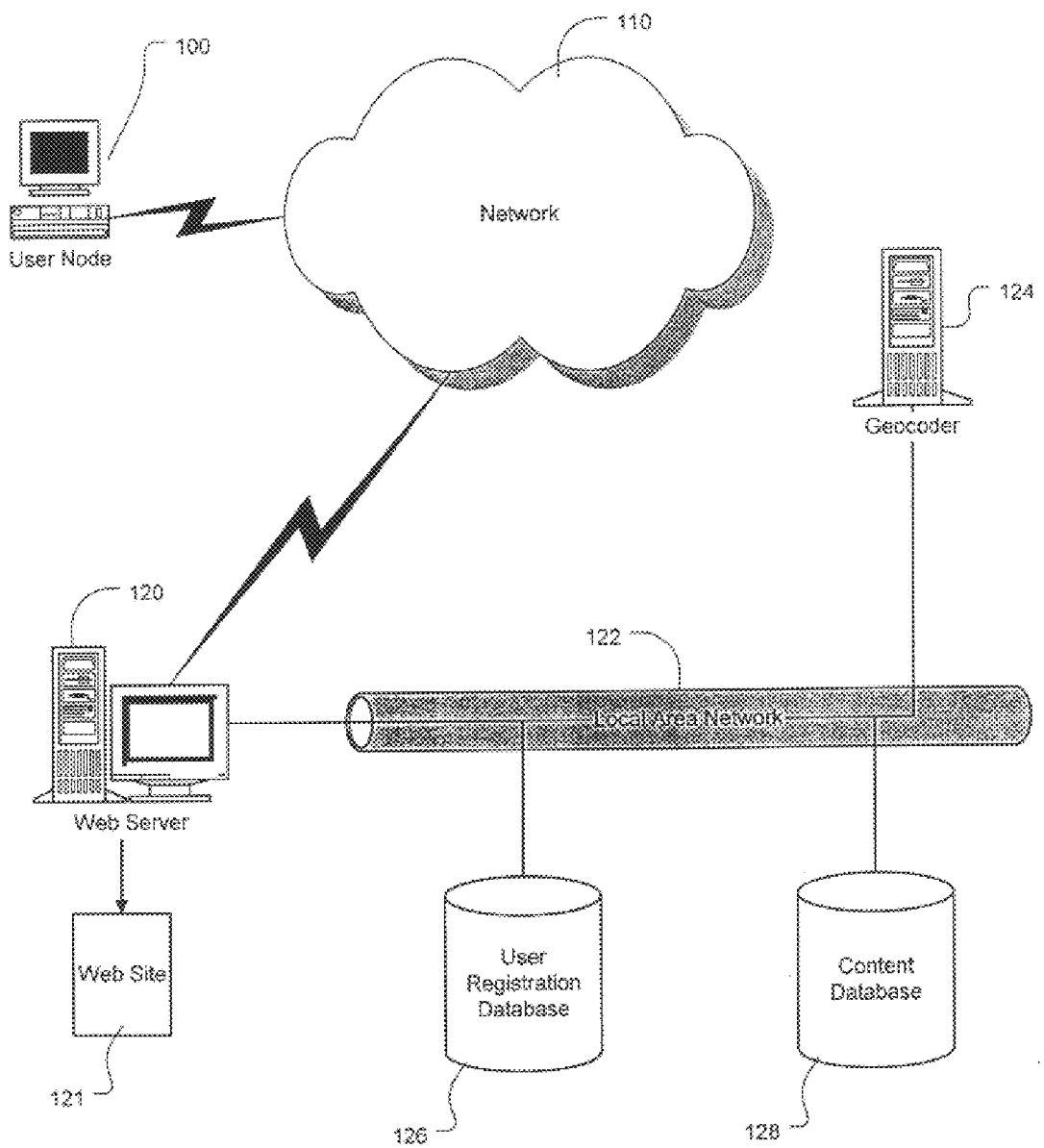
FIG. 1 is a high-level block diagram of an exemplary embodiment of the present invention that illustrates a system for providing web site content to a user based upon the user's geographic location information.

For purposes of this disclosure, the term "content" shall refer to any and all forms of information, features, and services that may be provided by a web server. In addition, the content contemplated by the present invention may be associated or otherwise correlated with a particular geographic area or areas. Types of content contemplated by various embodiments of the present invention include, without limitation, crime statistics, telephone directories, emergency medical services coverage areas, notices of local events, advertisements, promotions, chat room services, bulletin board services, email distribution services, and links to other web sites.

In some embodiments of the present invention, content may include an email distribution service, wherein users may automatically communicate information using email distribution services based on the user's address. For example, each user may belong to various email distribution lists based on geography and subject. In one particular embodiment, users of an email distribution service would receive regular email messages from an email distribution server on subjects that are relevant to their local geography as determined by their geocoding. The general implementation of email distribution lists is known in the art and includes, but is not limited to, listservs.

Content may also include a chat service wherein a user may have access to one or more geographically based chat rooms. For example, a user may be presented with a "neighborhood chat room" option, which, if selected, would place the user in a chat room for the user's particular neighborhood. Likewise, a "school district chat room" option would place the user in the chat room for the user's particular school district. In some embodiments, only users that are located within a particular geographic area would have access to the corresponding chat room. For example, a user would only be able to join chat rooms that correspond to the user's own geographic area. In other embodiments, chat rooms may be associated with particular topics in addition to geographic areas. Thus for each geographic area, chat rooms for topics such as "local events," "sports," "classified ads," etc. may be provided.

In one embodiment, the present invention may provide instant messaging technology to allow chat service users to be automatically notified when another chat user that meets specified criteria is online. For example, a user could configure the instant messaging technology to alert him or her when any other users are online in a chat room associated with a particular geographic area and/or topic. The general implementation of instant messaging technology is known within the art.

Content may also include a bulletin board service, wherein a user may have access to one or more geographically based electronic bulletin boards. Generally, electronic bulletin boards allow users to view and post messages. In these embodiments, users would have access to electronic bulletin boards that are specific to their geographic areas. For example, only users located within a particular neighborhood would have access to that neighborhood's bulletin boards. In some embodiments, bulletin boards may be organized topically as well as by geographic level. Many types and implementations of electronic bulletin board services are known in the art. Examples include, but are not limited to, moderated forums, unmoderated forums, and threaded forums.

User Interface/Display

Geographically-correlated content often lends itself to being displayed on a map. Accordingly, in many embodiments, such information is graphically presented to the user on a map. In preferred embodiments, the map automatically scales to the appropriate size based on the information being requested. The web or content server in these embodiments may utilize a set of rules to facilitate this automatic visual scaling. These rules may depend on a variety of factors, including, but not limited to, the subject matter of the content, the number of informational points that must be displayed, and preferences of the user. In some embodiments, the user may have the ability to zoom in/out or move to adjacent areas to seek additional information on a subject.

A simplified block diagram of an exemplary communications system is illustrated in FIG. 1. As shown, the communications system includes user node 100, web server 120 hosting a web page 121, geocoder 124, user registration database 126, and content database 128.

Web servers are generally known in the art. Typically, they are configured to provide content in response to requests from user nodes. In addition, web servers may be configured to implement various other features including without limitation, providing security functions, and handling financial transactions. As shown, web server 120 is coupled to network 110. In a preferred embodiment, a high-bandwidth connection (such as a T1 connection) is used. Advantageously, a high-bandwidth connection permits web server 120 to provide content and services to more users simultaneously than a lower bandwidth connection. However, it is to be understood that any type of connection (s) that allows the communication of signaling information may be used. For purposes of the present disclosure, the terms "coupling" and "connecting" are used synonymously to mean providing a communications path (either directly or indirectly) such that endpoints can transmit and receive signaling information from one another. Examples include, but are not limited to, analog or digital dial-up connections, cable modem connections, ADSL connections, LAN connections, ATM connections, T1 connections, and wireless connections.

In a preferred embodiment, network 110 is the Internet. However, the present invention contemplates the use of any known types of data networks. Examples include, without limitation, a corporate intranet, proprietary public network, private network, or wide area network.

As shown, user node 100 is coupled to network 110. The type of connection or connection medium is not important for purposes of the present invention. It is well known for user nodes to connect to a network. Examples include, but are not limited to, analog or digital dial-up modems, cable modems, and network interface cards.

In a preferred embodiment, web server 120 hosts web site 121. Web site 121 may be configured to be accessible to users through network 110. Web server 120 may be configured to provide content on web site 121 in response to requests from user node 100. A user may connect to web site 121 through network 110 by entering the URL of web site 121 in the address field of the user's web browser, or by following a hyperlink to web site 121. Though the present invention supports various web browsers—Microsoft's Internet Explorer and Netscape's Navigator are preferred. Though HTML browsers are used in a preferred embodiment, the invention contemplates use of all software that allows users to view content. Examples include, but are not limited to, XML browsers, VRML browsers, IRC clients, and proprietary software.

Figure 2:
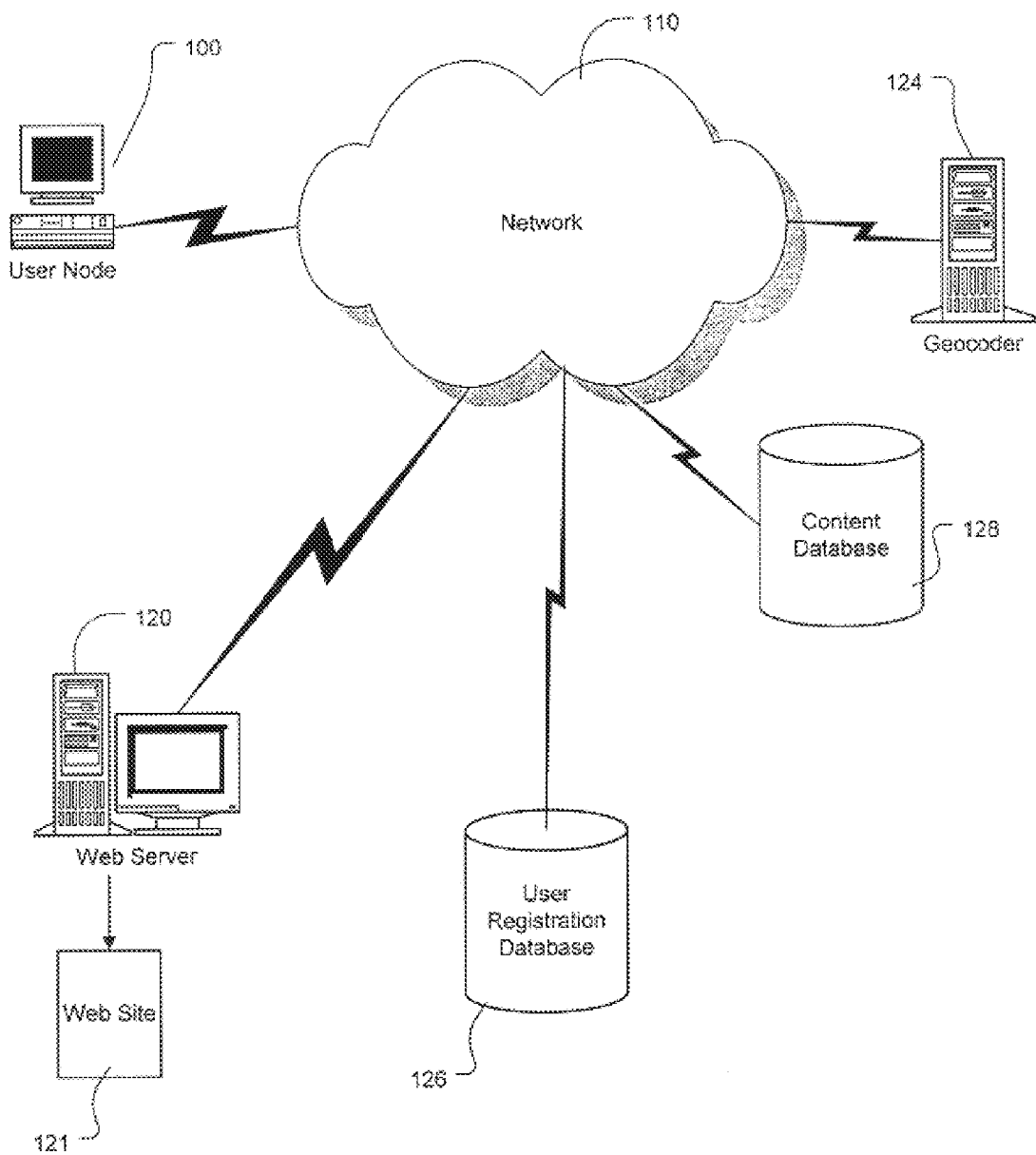
FIG. 2 is a high-level block diagram of an exemplary embodiment of the present invention that illustrates an alternate system for providing web site content to a user based upon the user's geographic location information.

As shown, the geocoder 124, user registration database 126, and content database 128 components are coupled to web server 120 through local area network (LAN) 122. Although these components are shown as connected through LAN 122, it is to be understood that the particular types and points of connection are immaterial to the present invention so long as the components can communicate with web server 120. For example, as shown in FIG. 2, geocoder 124, user registration database 126, and content database may be coupled to web server 120 through network 110. Alternatively, some components may be connected to network 110 and others through LAN 122, or directly to web server 120.

In addition, although the present invention is illustrated with each component as a separate device, it should be understood that the components could be combined into a single device or server, or implemented across multiple devices or servers without departing from the scope of the present invention. For example, in one embodiment content database 128 may comprise multiple physical databases at multiple network nodes. In another embodiment, components and functions may be duplicated to provide redundancy in the system to prevent excessive network downtime.

Figure 3:
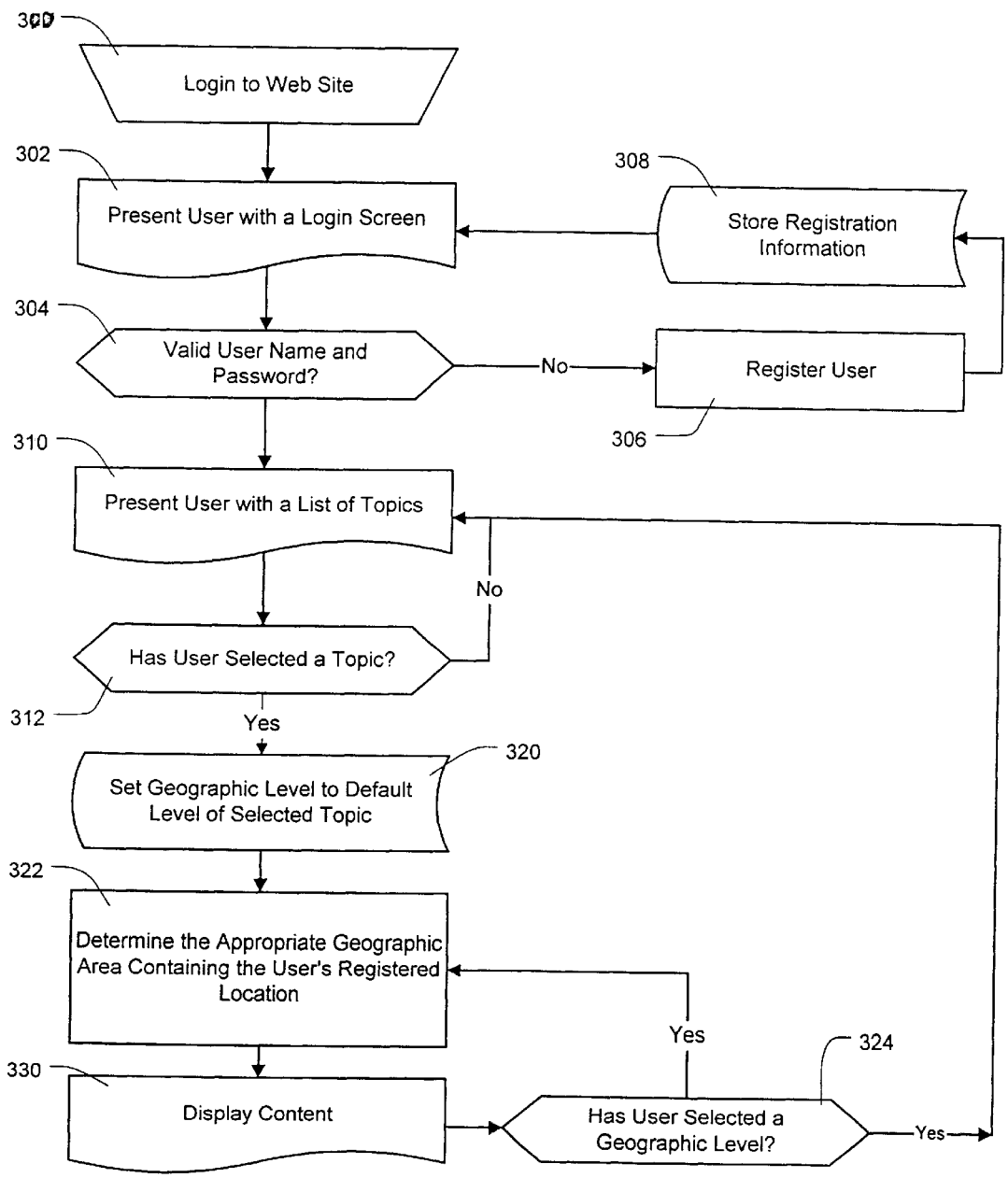
FIG. 3 is a flowchart depicting the operation of a content server providing web site content based upon a user's geographic location information.

FIG. 3 is an exemplary process flow of an embodiment of the present invention.

The process may be initiated in step 300 with user node 100 connecting to web site 121 hosted by web server 120. In some embodiments, general information on web site 121 may be available for browsing to all users. However, to access geographically correlated content of the present invention users must first be registered and authenticated.

Accordingly, the user may be presented with a login screen 302. In a preferred embodiment, the login screen prompts the user for a user name and password combination. Alternatively, other authentication methods may be used so long as web server 120 learns the identity of user node 100. For example, web server 120 may store a "cookie" containing the user's authentication information at user node 100. The term "cookie" refers to a piece of information sent by a web server to a web browser that the browser software is expected to save and to send back to the server whenever the server requests it. Cookies may contain information such as login or registration information. Thereby, during subsequent logins, web server 120 would simply obtain the requisite authentication information from the cookie, rather than by prompting the user. Advantageously, the use of cookies eliminates the problem of forgotten passwords. The general use and implementation of cookies for authentication is known in the art.

During registration process 306, various information may be collected about and/or from the user and stored in step 308. The type and quantity of information that may be collected and stored 308 are design decisions that depend on the specific implementation. For example, a commercial site or a site desiring a higher level of security may request a credit card number from the user. The present invention requires that an address or some other geographic location information be collected from the user and stored in step 308. In a preferred embodiment, the user may provide his or her home address during the registration. In other embodiments, the user may provide his or her work address or, alternatively, any address that the user desires to obtain information on. In another embodiment, the user may provide geographic coordinates rather than a street address. In particular, the user may provide GPS location information.

In a preferred embodiment the geographic location information provided may then be geocoded and the resulting coordinates stored as part of the user's registration information. Advantageously in this embodiment, web server 120 would not have to perform the extra step of geocoding the user's address each time the user requested geographically correlated content; web server 120 would be operable to use the stored coordinates directly. In other embodiments, however, a user's address may be stored and later geocoded as needed.

In a preferred embodiment, new users may be given the option to register online through web site 121. Alternatively, registration may take place over the phone, in person, or through the mail. In many embodiments, at some point during the registration process, the user will be assigned a unique login name and password. Thereby, the user may use the login name and password to subsequently access web site 121.

In the next step 304, web server 120 verifies that the user name and password are correct. In particular, web server 120 may compare the provided authentication information with data stored in user registration database 126.

Once the user is authenticated, the user may be presented with a list or menu of content 310 that the user may access. For purposes of the present disclosure, each item on the list or menu of content choices is referred to as a content topic.

The term "content topic" includes available information subjects, and available services. In a preferred embodiment, the present invention may be configured such that each registered user can access only that content relating to each user's corresponding geographic area(s). For example, in embodiments wherein the content includes a chat room or bulletin board that corresponds to a particular neighborhood, only registered users whose geographic location or address falls within that particular neighborhood would have access.

In some embodiments of the present invention, each content topic may have an associated default geographic level. Geographic levels include, without limitation, census tracts, neighborhoods, school districts, school boundaries, EMS coverage "zones," and trade areas. It is important to note that the term "geographic level" as used in the present disclosure refers to geographic levels in the abstract rather than to particular census tracts, neighborhoods, etc. The term "geographic area" is used throughout the present disclosure to refer to a specific geographic boundary corresponding to an abstract geographic level. For example, with Austin, Tex., the geographic area would be "Austin" and the geographic level would be "city." Thus, in this embodiment, when a user requests a particular content topic, the content corresponding to a particular geographic area containing the user's geographic location and having the scope of the default geographic level is delivered. In an alternate embodiment, the desired geographic level may be specified in the user's request for content. Thereby, when a user requests a particular content topic, the content corresponding to a particular geographic area containing the user's geographic location and having the scope of the specified geographic level is delivered.

In step 322, web sever 120 dynamically determines the geographic area containing the user's registered geographic location and having the scope of the desired (whether default or user-specified) geographic level. In a preferred embodiment, web server 120 is operable to retrieve the user's coordinates that had previously been stored during the registration process (from step 308). In other embodiments, web server 120 retrieves the user's stored address information (from step 308) and uses geocoder 124 to obtain geographic coordinates corresponding to the user's address information. Then, using known spatial mapping techniques, web server 120 may use the user's coordinates to determine the specific geographic area that corresponds to the desired geographic level. For example, in one embodiment, web server 120 may compare user's coordinates to a table containing geocoded information for the boundaries of the geographic areas to determine which geographic areas the user falls within.

In many instances, any one particular geographic location may fall within numerous geographic areas of varying geographic levels. Conceptually, geographic areas of varying geographic levels could be thought of as polygons of overlapping scope. For example, a polygon defining a school district may contain several neighborhood polygons, which in turn, may overlap with several census tract polygons. In other embodiments, some or all of the polygons may be dynamically defined. Using well-known techniques, web server 120 can determine which polygons (geographic areas) that the user's coordinates fall within. In some instances, users may find themselves in multiple polygons of the same level, e.g., multiple neighborhood associations. In the case where a user falls within multiple geographic area polygons of the same geographic level, web server 120 may use the union of those polygons. In alternate embodiments, web server 120 may prompt user node 100 to choose one polygon(s).

In addition, the number and name of available geographic levels may vary with each particular location or region. For example, populous urban areas may have more geographic levels than less populous rural areas.

Similarly, the scope or breadth of a geographic level may vary depending on the content topic. For example, the "trade area" geographic level generally refers to an area surrounding a commercial establishment within which a customer may be willing to travel to go to the commercial establishment. The size and shape of a particular trade area may depend on a number of factors including, without limitation, the type of commercial establishment and characteristics of typical or targeted customers. For example, the trade area for automobile dealerships may be much larger than the trade area for a grocery store. Alternatively, a trade area may be defined to include a specific number of a type of commercial establishment. For example, the trade area for hospitals may be defined as an area around a point that contains at least three hospitals. In this embodiment, the boundaries of the specific geographic area corresponding to the hospital trade area would be calculated dynamically based upon a user's location. Web server 120 would find the three closest hospitals and define a polygon to encompass them. The shape of the dynamically determined polygon is a design decision and a function of whatever algorithm is used. For example, in one embodiment, the polygon may be a rectangle that includes all of the desired coordinates.

Next, for information content, web server 120 retrieves information from content database 128 corresponding to the relevant geographic area. In one embodiment content in content database 128 may be stored in a hierarchical structure corresponding to geographic levels. In preferred embodiments, however, web server 120 is configured to search content database 128 to find content relating to the coordinates or polygons in the range of the desired geographic area irrespective of the structure of content database 128. In some embodiments, this may be accomplished through the use known spatial mapping techniques. Similarly, for service content such as chat rooms and bulletin boards, web server 120 provides services corresponding to the relevant geographic area.

A key feature of the present invention is that a specific geographic area need not be chosen by the user. Rather, after a user registers using an address or other form of location information, the system determines which specific geographic areas correspond to the user and seamlessly provides geographically-correlated content. Accordingly, a user of the present invention would be able to request "schools in my neighborhood" or "crime statistics in my county" rather than manually having to specify the particular school district, neighborhood, or county.

After the content is displayed 330 the user may select another topic 310 or the user may select another geographic level 324. For example, in addition to the elementary schools in a user's neighborhood (the default geographic level for the topic), a user may want to know what elementary schools are in his or her city, or within a 10-mile radius. The web server 120 would then use the means described above to determine what the specific geographic area is that corresponds to the desired geographic level and search for information in the content database using this new specific geographic area.

In an alternative embodiment, the present invention may be configured to display content corresponding to a user's geographic area automatically without prompting the user with a list of topics. For example, upon logging in, the user may be presented with the local weather and upcoming neighborhood events.

Figure 4:
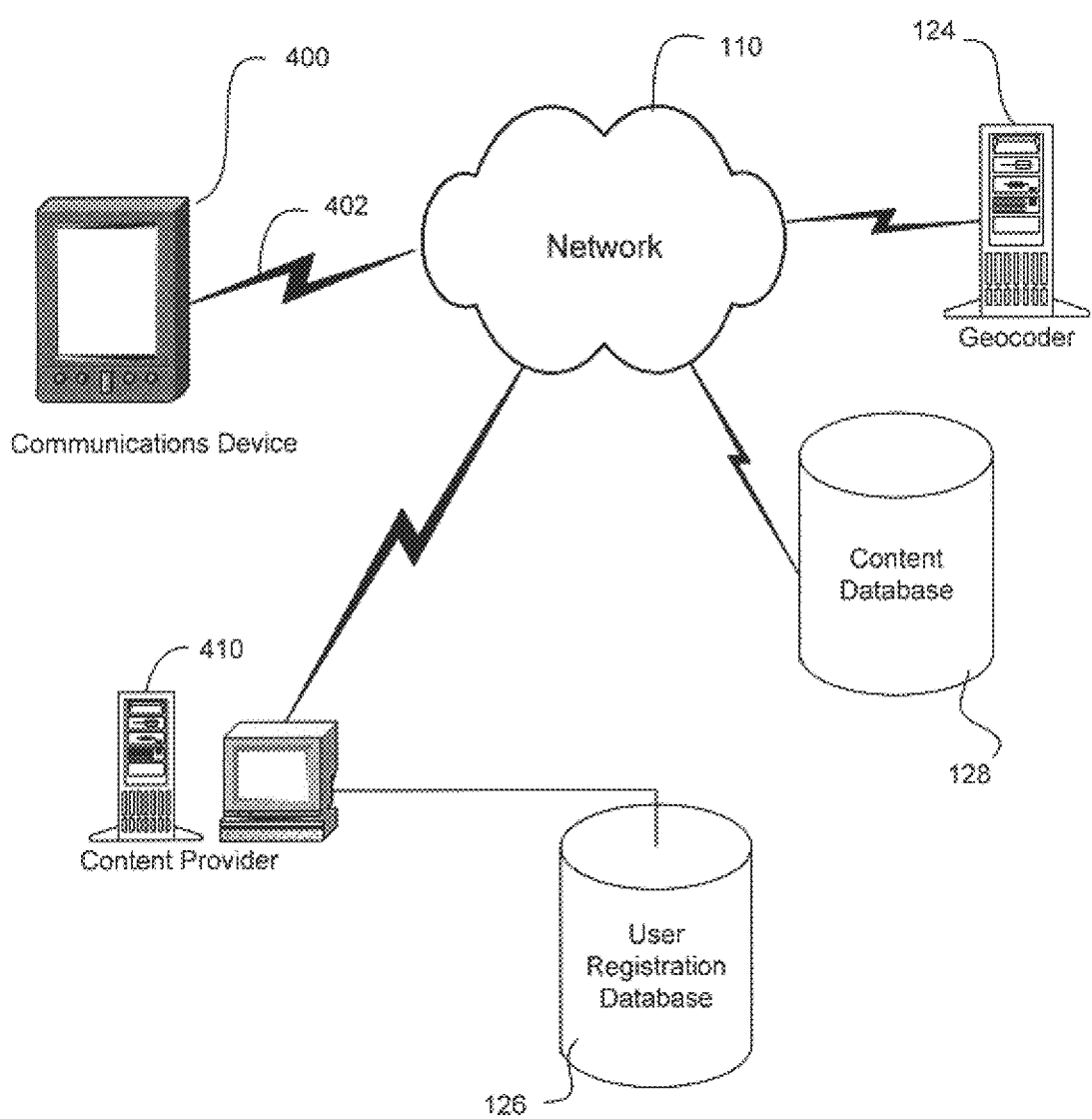
FIG. 4 is a high-level block diagram of an alternate embodiment of the present invention that illustrates an system for providing content to a communication device based upon the communication device's geographic location.

A simplified block diagram of an alternate embodiment of a communications system of the present invention is illustrated in FIG. 4. As shown, the communications system includes communications device 400, content provider 410, user registration database 126, content database 128, and geocoder 124. As discussed in conjunction with the system of FIG. 1, these components may be configured to communicate either directly, through a LAN, or through network 110.

As shown, communications device 400 is coupled to network 110 through connection 402. In a preferred embodiment, connection 402 is a wireless connection. In this embodiment, communications device 400 may be a cellular, personal digital assistant, or other wireless communications device. Advantageously, a wireless communications device permits its user to obtain information in the field without the use of bulky personal computers. In one embodiment, communications device 400 may be hand-held. In an alternate embodiment, communications device 400 may be installed in an automobile.

Figure 5:
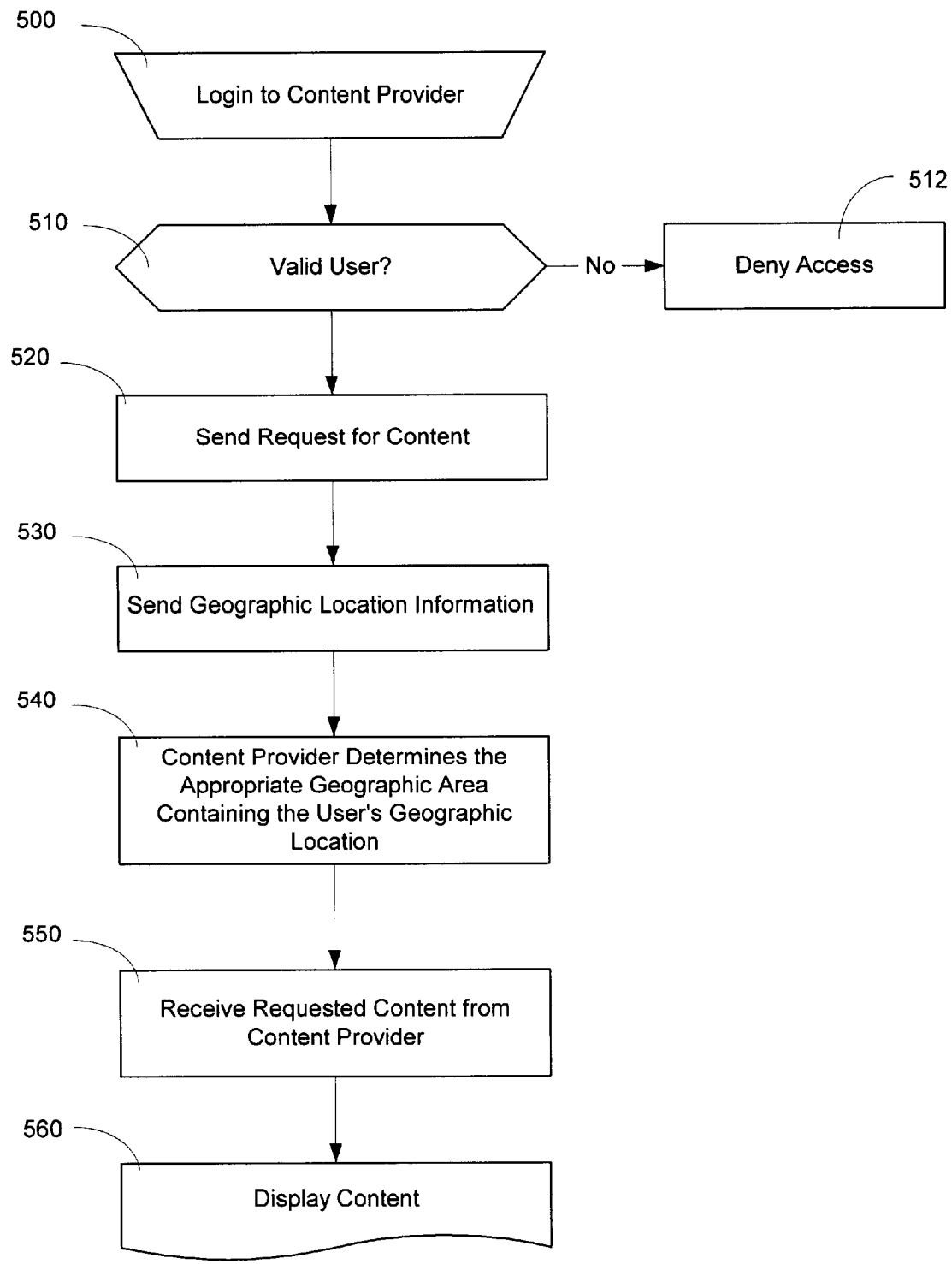
FIG. 5 is a flowchart depicting the operation the embodiment depicted in FIG. 4.

FIG. 5 is an exemplary process flow of the embodiment of the present invention depicted in FIG. 4. The process is initiated in step 500 with communications device 400 connecting to content provider 410. In preferred embodiments, content provider 410 first authenticates in step 510 the user of communications device 400 before providing access to any information. In the illustrative embodiment, if a user does not have a registered account, the user is denied access 512. In a preferred embodiment, the user must register for an account either through a telephone, the mail, or online through a PC. In this embodiment, it is often unwieldy to allow registration through a handheld device such as a Palm Pilot or other personal digital assistant. However, other embodiments (not shown), allow users to register using communications device 400.

In the next step 520, after communications device 400 has been authenticated, communications device 400 may be configured to transmit a request for information to content provider 410. Communications device 400 is also configured to send geographic location information 530. In a preferred embodiment, these two steps may occur at essentially the same time or in the same request.

Next, in step 540, using techniques previously discussed with respect to step 322, content provider 410 determines the appropriate geographic area containing the user's geographic location. The scope of the geographic area is preferably determined from geographic level associated with the particular information that is requested. For example, if a user requests information regarding nearby restaurants, the geographic area may correspond to a "trade area" geographic level which most likely would be the current neighborhood, or a polygon with a radius of a few miles around the current location. Similar, if the requested information is for car dealerships, a "trade area" geographic level may also be used. However, a car dealership trade area would likely be much larger than a restaurant trade area. In alternate embodiments (not shown), communications device 400 may also transmit a desired geographic level. In one of these embodiments, the user may select the desired geographic level.

Next, in step 550 the requested information is provided from content provider 410 to communications device 400. Then, communications device 400 is configured to display the requested information 560. The format in which the information is displayed depends upon the display characteristics of communications device 400. Generally, the formatting of content is well known in the art.

Figure 6:
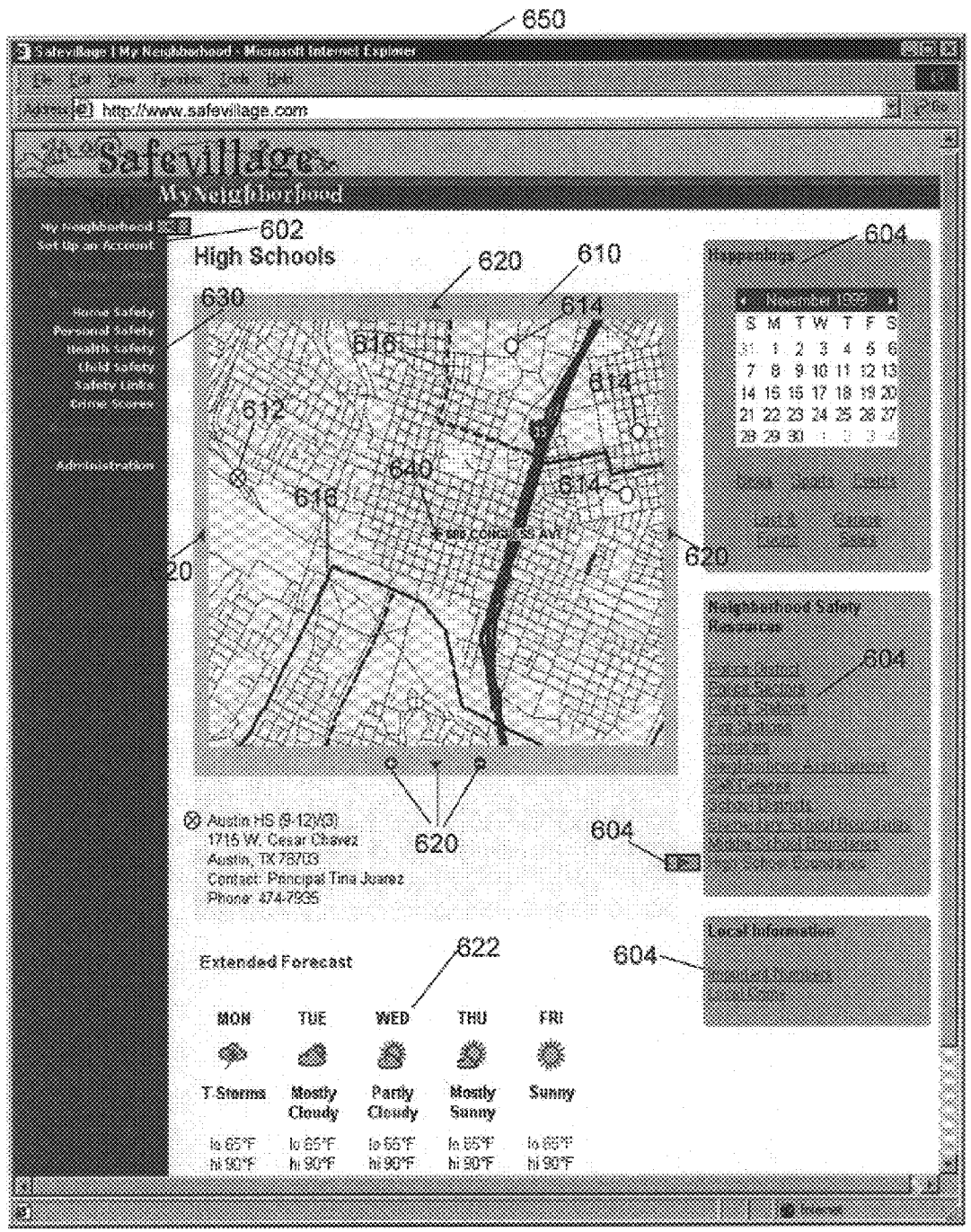
FIG. 6 is a screen shot of content being provided to a remote user according to one embodiment of the present invention.

FIG. 6 is a screen shot of content provided to a remote user according to an embodiment of the present invention. The depicted "Safevillage" web site and its host web server are an example of one embodiment of the present invention. With this particular screen shot, the remote user has previously connected to the "Safevillage" web site, been authenticated, and requested information regarding high school boundaries. FIG. 6 illustrates the results of the user's request for information.

As shown, the "Safevillage" web site 600 may be accessed through the use of web browser 650. Though Microsoft's Internet Explorer is depicted, it is to be understood that any browser or software configured to display content may be used. The specific layout of information may be generally specified by web site 600, but the implementation may depend on the type of browser or software being used.

If the remote user selects the "My Neighborhood" menu option 602, he or she may be presented with a list of content topics 604 that correspond to the remote user's registered geographic location 640. The appropriate content may be displayed upon the remote user's selection of a particular content topic. As shown, the remote user chose the "High School Boundaries" menu option 604.

School boundaries are one of many content topics that is well-suited for being graphically displayed on a map. Other examples include, but are not limited to, police districts police sectors, police stations, fire stations, hospitals, neighborhood associations, school districts, and trade areas. In a preferred embodiment, content is displayed on map 610. Advantageously, map 610 may be automatically scaled to appropriately display the requested content. For example, as shown, map 610 has been zoomed to such a level as to enable the remote user to see the high school boundaries 616 that correspond to the remote user's default assigned high school 612, Austin H.S., and a small portion of the surrounding area and schools 614. With a different content topic, e.g "hospitals," map 610 may be automatically zoomed in or out to a level that is appropriate to display that content. In a preferred embodiment, map 610 may contain display controls 620 to allow the remote user to customize the displayed portion of the map for example, by manually zooming in and out and/or repositioning the display portion of the map. In a preferred embodiment, content displayed on map 610 may be linked to additional information which may be accessed by clicking on the corresponding icons appearing in map 610. For example, the user may obtain contact information from any of high schools 614 by clicking on them. As shown, contact information for the default high school 612 is presented in a non-graphical manner below map 610.

Other content topics may be better suited to being displayed in other manners. For example, local weather forecast information 622 corresponding to the remote user's registered geographic location 640 may be displayed in a table. The specific characteristics of displayed content are design decisions that may take into account numerous factors including, without limitation, the subject matter of the content, and characteristics of the remote users.

As discussed earlier, in some embodiments of the present invention, general information may be available to all remote users regardless of whether they have registered or have been authenticated. For example, in the illustrative embodiment, the public menu options 630 include "home safety," "personal safety," "health safety," "child safety," "safety links," and "crime scores." However, the geographically correlated content may only be accessible by registered users.

The preceding examples are included to demonstrate specific embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

What is claimed is:

1. A method of providing content to a user on a network, comprising the steps by a network server of:

storing registration information of said user, wherein the registration information comprises specific geographic information;

determining geographic coordinates from said geographic location information; and seamlessly providing content to said user corresponding to a geographic area containing said geographic coordinates in response to a request for content by said user, said requested content having a subject matter;

in response to said request for content by said user, said network server dynamically determining said geographic area based upon a desired geographical level, said desired geographic level determined automatically, by said network server, based upon said subject matter of said content requested by said user.

2. The method of claim 1, wherein said network is the Internet.

3. The method of claim 1, wherein a geocoder is used in determining geographic coordinates from said specific geographic location information.

4. The method of claim 1, wherein said specific geographic location information includes an address.

5. The method of claim 1, wherein said specific geographic location information corresponds to said user's home address.

6. The method of claim 1, wherein said specific geographic location information includes Global Positioning System (GPS) data.

7. A communications system comprising:

a content provider node, said content provider node configured to store plural content topics and plural geographic levels, each one of said plural content topics associated with one of said plural geographic levels;

a communications device coupled to said content provider node, wherein said communications device has an associated geographic location;

wherein said communications device is configured to provide a request for content to said content provider node, said request for content comprising a desired content topic and information relating to said associated geographic location of said communication device; and wherein said content provider node is configured to be responsive to requests for content from said communications device by providing content to said communication device, wherein said content seamlessly corresponds to a geographic area encompassing said associated geographic location of said communication device;

said geographic area corresponding to said one of said plural geographic levels associated with said desired content topic.

8. The system of claim 7, wherein said user node is coupled to said network through a wireless medium.

9. The system of claim 7, wherein said information relating to said associated geographic location comprises GPS coordinate data of said communication device.

10. The method of claim 1, wherein said desired geographic level is a census tract.

11. The method of claim 1, wherein said desired geographic level is a neighborhood.

12. The method of claim 1, wherein said desired geographic level is a subdivision.

13. The method of claim 1, wherein said desired geographic level is a school district.

14. The method of claim 1, wherein said desired geographic level is a trade area.

15. The method of claim 1, wherein said content includes a chat room service, said chat room service comprising the step of allowing said user to access one or more electronic chat rooms corresponding to said geographic area.

16. The method of claim 15, wherein said chat room service further comprises instant messaging functionality.

17. The method of claim 1, wherein said content includes a bulletin board service, said bulletin board service comprising the step of allowing the user to access one or more electronic bulletin boards corresponding to said geographic area.

18. The method of claim 1, wherein said content includes an email distribution service, said email distribution service comprising the step of providing access to said user one or more email distribution lists corresponding to said geographic area.

19. The method of claim 1, wherein said content includes one or more promotional notices corresponding to said geographic area.

20. The method of claim 1, wherein said content includes one or more links to web sites corresponding to said geographic area.

21. The method of claim 1, wherein said content includes a directory service, said directory service comprising telephone directory information corresponding to said geographic area.

22. A communications system, comprising:

a content provider node, said content provider node configured to store plural content topics and plural geographic levels, each one of said plural content topics associated with one of said plural geographic levels; and a web site hosted by said content provider node, wherein said web site is configured to be accessible by one or more remote users, wherein each of said one or more remote users has an associated geographic location, and wherein said content provider node is configured to store said associated geographic location; and wherein said content provider node is configured to be responsive to requests for content from one or more remote users by providing content on said web site for said one or more remote users, said requests for content including a desired content topic; and wherein said content seamlessly corresponds said desired content topic to a geographic area encompassing said associated geographic location;

said geographic area corresponding to said one of said plural geographic levels associated with said desired content topic.

23. The system of claim 22, wherein said associated geographic location comprises geocoded coordinates.

24. A communications system comprising:
a user node configured to operatively couple to a network, said user node configured to provide requests for information on said network, and said user node having an associated geographic location; and
a content provider node configured to operatively couple to said network, said content provider node having a respective web site, and said content provider node configured to store plural content topics and plural geographic levels, each one of said plural content topics associated with one of said plural geographic levels;
wherein said web site is configured to be accessible by said user node, and is configured to store said associated geographic location;
wherein said content provider node is configured to be responsive to requests for information from said user node by providing content on said web site for said user node, said requests for information comprising a desired content topic; and
wherein said content seamlessly corresponds to said desired content topic and to a geographic area encompassing said associated geographic location of said user node;
said geographic area corresponding to said one of said plural geographic levels associated with said desired content topic.

25. The system of claim 22, wherein said geographic area is dynamically determined by said content provider node based upon said geographic level associated with said desired content topic and said associated geographic location.

26. The system of claim 25, wherein said desired geographic level is a census tract.

27. The system of claim 25, wherein said desired geographic level is a neighborhood.

28. The system of claim 25, wherein said desired geographic level is a subdivision.

29. The system of claim 25, wherein said desired geographic level is a school district.

30. The system of claim 25, wherein said desired geographic level is a trade area.

31. The system of claim 22, wherein said content includes a chat service, wherein said chat service comprises one or more electronic chat rooms corresponding to said geographic area and configured to be accessible by said one or more remote users.

32. The system of claim 31, wherein said chat room service further comprises instant messaging functionality.

33. The system of claim 22, wherein said content includes a bulletin board service, wherein said bulletin board service comprises one or more electronic bulletin boards corresponding to said geographic area and configured to be accessible by said one or more remote users.

34. The system of claim 22, wherein said content includes an email distribution service, said email distribution service comprising one or more email distribution lists corresponding to said geographic area and configured to be accessible by said one or more remote users.

35. The system of claim 22, wherein said content includes one or more promotional notices corresponding to said geographic area, wherein said promotional notices are configured to be accessible by said one or more users.

36. The system of claim 22, wherein said content includes one or more links to web sites corresponding to said geographic area, wherein said one or more links are configured to be accessible by said one or more remote users.

37. The system of claim 22, wherein said content includes a directory service, said directory service including telephone directory information corresponding to said geographic area, and configured to be accessible by said one or more remote users.

38. The system of claim 24, wherein said network is the Internet.

* * * * *